(12) United States Patent
Ritz et al.

(10) Patent No.: US 8,113,975 B2
(45) Date of Patent: Feb. 14, 2012

(54) CHAIN WHEEL AND TIMING CHAIN DRIVE FOR THE COMPENSATION OF DYNAMIC LOADS

(75) Inventors: Andreas Ritz, Munich (DE); Lutz Welke, Ingolstadt (DE); Volker Hirschmann, Furstenfeldbruck (DE)

(73) Assignee: IWIS Motorsysteme GmbH & Co. KG, Munich (DE)

( * ) Notice: Subject to any disclaimer, the term of this patent is extended or adjusted under 35 U.S.C. 154(b) by 544 days.

(21) Appl. No.: 12/296,484

(22) PCT Filed: Jan. 5, 2007

(86) PCT No.: PCT/EP2007/000069
§ 371 (c)(1),
(2), (4) Date: Dec. 31, 2008

(87) PCT Pub. No.: WO2007/118519
PCT Pub. Date: Oct. 25, 2007

(65) Prior Publication Data
US 2009/0275434 A1 Nov. 5, 2009

(30) Foreign Application Priority Data
Apr. 12, 2006 (DE) .......................... 10 2006 017 247

(51) Int. Cl.
*F16H 7/06* (2006.01)
(52) U.S. Cl. ....................................................... 474/155
(58) Field of Classification Search .................. 474/155, 474/153, 152, 148, 156
See application file for complete search history.

(56) References Cited

U.S. PATENT DOCUMENTS

| | | | | |
|---|---|---|---|---|
| 4,227,422 A * | 10/1980 | Kawashima et al. | ......... | 474/156 |
| 4,261,214 A * | 4/1981 | Watanabe et al. | ............. | 474/156 |
| 4,348,199 A * | 9/1982 | Oonuma et al. | ............. | 474/156 |
| 6,910,980 B2 * | 6/2005 | Hamilton | ........................ | 474/161 |
| 7,232,392 B2 * | 6/2007 | Hamilton | ........................ | 474/161 |
| 2003/0176251 A1 | 9/2003 | Hamilton | | |
| 2004/0204274 A1* | 10/2004 | Young | ........................... | 474/156 |

FOREIGN PATENT DOCUMENTS

DE 37 39 336 C2 6/1989

(Continued)

OTHER PUBLICATIONS

Japanese Patent Office, Examination Report in Japanese patent application No. JP 2009-504576 (Mar. 22, 2011).

*Primary Examiner* — Michael Mansen
*Assistant Examiner* — Juan Campos, Jr.
(74) *Attorney, Agent, or Firm* — Leydig, Voit & Mayer, Ltd.

(57) ABSTRACT

The invention relates to a chain wheel (2, 3), especially for a timing chain drive, with a rotary shaft, a sprocket wheel (7) positioned around the rotary shaft featuring multiple alternating teeth (17) and tooth gaps (16) distributed around its circumference, as well as at least one chain guide (8), the sprocket wheel (7) and the chain guide (8) are rigidly joined, the chain guide (8) incorporates a contoured surrounding support cage (9) causing it to bear on contact faces of link plates (13, 14) and the support cage (9) or raised regions of the support cage (9) extend along a curved circumference that constitutes the perimeter of the chain guide (8), said perimeter of the chain guide (8) having a non-circular profile.

18 Claims, 5 Drawing Sheets

FOREIGN PATENT DOCUMENTS

| | | |
|---|---|---|
| DE | 39 20 528 C1 | 6/1990 |
| DE | 195 20 508 A1 | 12/1996 |
| DE | 202 20 367 U1 | 7/2003 |
| DE | 203 19 172 U1 | 5/2004 |
| DE | 10 2004 027 064 A1 | 12/2005 |
| EP | 0 097 041 B1 | 4/1989 |
| EP | 1 184 593 A1 | 3/2002 |
| JP | 61-171942 A | 8/1986 |
| JP | 63-251654 A | 10/1988 |
| JP | 10-266868 A | 10/1998 |
| JP | 2005-521003 A | 7/2005 |
| WO | WO 01/28099 A2 | 4/2001 |
| WO | 1 208 646 A2 | 5/2002 |
| WO | WO 03/046413 A1 | 6/2003 |
| WO | WO 03/081084 A1 | 10/2003 |
| WO | WO 03/093700 A2 | 11/2003 |

\* cited by examiner

CHAIN WHEEL AND TIMING CHAIN DRIVE FOR THE COMPENSATION OF DYNAMIC LOADS

The invention relates to a chain wheel, in particular for a timing chain drive, comprising an axis of rotation, a sprocket arranged around the axis of rotation and having a plurality of circumferentially distributed alternating teeth and tooth gaps, and at least one chain guide, said sprocket and said chain guide being rigidly joined, said chain guide being provided with a circumferentially extending support contour for bearing on contact faces of link plates, and said support contour or raised portions thereof extending along a curved circumference which constitutes the perimeter of the chain guide. In addition, the invention relates to a corresponding timing chain drive for compensating mechanical loads, comprising a hinge chain, a driving chain wheel and at least one driven chain wheel.

In the development of motor vehicles, the NVH behaviour (noise, vibration and harshness) becomes increasingly important. In addition to the customers' wishes for high vibration comfort, a lower noise and vibration load on the driver will also contribute to active security. Furthermore, in particular the vibration loads impair the service life and the necessary dimensioning of the components in question.

In a motor vehicle a large number of components act simultaneously as excitation sources for vibrations and noise. These components are, in addition to the internal combustion engine itself, the power train, the transmission, the fan, the intake system, the exhaust gas system as well as the tyres and the chassis, the noise and vibrations originating from the individual noise and vibrations sources being not negligible. However, the vibration and noise excitations of the power train, e.g. rotational vibrations of the crankshaft and of the camshaft, irregular rotary motions of the flywheel, bearing loads as well as angular speed variations and torque excitations of the crankshaft, play a dominant role in this respect. These dynamic loads of the power train, especially of a timing chain drive used for internal combustion engines and consisting of a crankshaft chain wheel, at least one camshaft chain wheel and a driving chain, propagate dominantly throughout the whole vehicle and superimpose themselves on all the other noise and vibration sources.

The reduction of dynamic loads in the power train, regardless of whether a toothed belt or a toothed chain is used for the purpose of driving, has been one of the top priorities in the field of internal combustion engine development for many years. DE 37 39 336 C2, for example, discloses that rotational vibrations are counteracted by the use of a vibration absorber, which, however, entails substantial additional expenditure and necessitates a substantial amount of additional installation space. DE 39 20 528 C1 suggests that the alternating torques originating from the camshaft should be counteracted by a hydraulic brake unit. DE 195 20 508 A1 describes, for a toothed belt drive, a non-circular pulley which is used as a camshaft pulley so as to reduce the excitation of vibrations. The non-circular pulley shown in this publication has four projecting and four non-projecting areas which are arranged around the pulley at regular intervals. In addition, JP 10266868 A discloses an oval crankshaft pinion for a toothed-belt timing drive. DE 202 20 367 U1 and DE 203 19 172 U1 additionally describe the development of a synchronous drive unit, which is not limited to toothed belts and which reduces the dynamic load of the power train through an opposite, fluctuating corrective torque by means of a non-circular profile, in particular an elliptical profile, of at least one toothed belt wheel.

Load-reduced timing chain drives are known e.g. from EP 907 041 B1 and from EP 1 308 646 A2. The teeth of a chain wheel are here slightly displaced, as regards their radial and circumferential position, in comparison with a conventional uniform spacing. In this way, the radial engagement positions of the chain hinges between the chain wheel teeth are varied, whereas the pitch spacing between the meshing chain hinges remains constant. The arrangement of the chain wheel teeth is either randomly distributed or it is selected with respect to a uniform control chain load.

In addition, chain drives for flat-link articulated chains are known, which vary the coming-in and contacting behaviour of the chain in the chain wheel with the aid of a supplementary chain guide. The link plates of the chains bear on these guides thus varying the engagement of the chain hinges with the teeth. Firstly, JP 61171942 A discloses rotatably supported guides, which have an enlarged diameter and which are arranged eccentrically with respect to the chain wheels, so as to realize a less steep coming-in angle of the chain. For reducing the contact load between the chain hinges and the teeth of the chain wheels, WO 03/093700 A2 suggests a chain guide comprising respective coming-in guides extending in displaced relationship with the circular guide section of the chain wheel. EP 1 184 593 B1 additionally discloses a chain guide for reducing the contact noise between the chain hinge and the teeth. The chain guide is here connected to the chain wheel in such a way that the instantaneous centre of rotation of a meshing chain link passes from the first chain hinge to the point of contact of the chain link plate with the support contour of the chain guide and then to the second chain hinge. The rocking movement resulting from such a chain guiding mode allows the desired reduction of noise and vibration. Depending on the structural design of the chain link plates and their contact faces, the chain guide connected to the chain wheel is provided with a smooth or with an uneven surface, i.e. circular, linear, convex or concave segments recurring in correspondence with the number of teeth of the chain wheel at identical distances from the respective teeth.

Many of the solutions known from the prior art for reducing the noise and vibration load of the power train proved to be useful in the course of their use. The present intensive efforts to improve the NVH behaviour in motor vehicles still further necessitate additional development efforts, in particular also in the case of the dominant noise and vibration source of the power train. In addition, the dynamic load on the drive is still comparatively high when the hitherto available solutions are used. A further load reduction in the timing drive is therefore desirable and, through the downsizing effects, it could also lead to a reduction of costs in the sphere of the timing drive.

It is therefore the object of the present invention to reduce the dynamic load in the power train, in particular in a timing chain drive, and to avoid the disadvantages of known solutions as well as to surpass their efficiency.

In the case of a chain wheel of the type in question, this object is achieved by providing the perimeter of the chain guide with a non-circular profile.

By means of said non-circular profile of the perimeter of the chain guide, an additional excitation is effectively introduced in the timing drive and the chain forces in the timing drive are reduced. The provision of this effective additional excitation of the timing drive in such a form that it will occur in the area of resonant locations causes a substantial reduction of the chain forces and allows thus not only an improvement of the NVH behaviour but also a smaller dimensioning of the timing drive without altering the performance and the conditions of use.

According to preferred embodiment, the distance between the perimeter and a centre of the chain guide can vary, at least partially, from one tooth to the next so as to define the non-circular profile. The non-circular shape of the curved circumference of the support contour varies from one area to the next with the angle of rotation of the chain wheel, i.e. the distances between the axis of rotation and the perimeter of the chain guide vary, at least partially, for the respective radial lines extending through the centre of the tooth apexes (or another recurring point of the tooth profile) and the axis of rotation. In the case of a uniform variation of the distances, a sinusoidal shape of the support contour is obtained, and this is advantageous with respect to the synchronization of a timing chain drive. The non-circular profile of the perimeter of the chain guide is thus independent of support contour discontinuities recurring in the area of the teeth or tooth gaps.

An advantageous embodiment is so conceived that the perimeter of the chain guide includes at least two projecting sections. The use of at least two projecting sections allows a compensation or reduction of a plurality of recurring excitations during a rotation of the chain wheel. The perimeter of the chain wheel can especially have an elliptical profile so as to compensate two excitations recurring at regular intervals, e.g. a sinusoidal excitation which can, for example, occur at the crankshaft of a four-cylinder in-line internal combustion engine. The elliptical profile of the chain guide preferably has an aspect ratio of the largest and smallest distances to the centre of the chain guide which is smaller than 1.025, and which is preferably between 1.01 and 1.015. This aspect ratio allows a more uniform distribution of the forces transmitted by the teeth of the chain wheel and the chain guide into the timing drive. The number of projecting sections and, consequently, also the number of depressions can be chosen especially in accordance with the engine order of the engine whose vibration behaviour is to be influenced.

An expedient embodiment is so conceived that the centre of the chain guide is located in the axis of rotation of the chain wheel. Due to the arrangement of the centre of the chain guide in the axis of rotation of the chain wheel, i.e. the centre of the chain wheel, a mass distribution is achieved which is as uniform as possible, and this is the basis for the best possible true running of the chain wheel.

For applying the forces from the chain wheel according to the present invention uniformly to the power train, two chain guides are provided, said chain guides being arranged symmetrically, especially such that one chain guide is arranged on each side of the sprocket of the chain wheel.

One variant is so conceived that the sprocket is circular and/or that the teeth of the sprocket are arranged uniformly around the axis of rotation. In most of the conventional timing chain drives circular chain wheels with uniformly arranged teeth are used. Conventional chain drives can thus be equipped with a chain wheel according to the present invention without major structural modifications being necessary. In addition, it is also possible to combine the at least one chain guide having a non-circular perimeter profile with a non-circular chain wheel or chain wheel teeth which are arranged in a non-uniform fashion on the chain wheel as regards their radial and circumferential position. Due to the superposition of various compensation effects, such a combination can render the dynamic loads in the power train even more uniform.

A preferred embodiment is so conceived that, in a tooth gap segment of the chain wheel having the smallest distance of the non-circular profile of the chain guide to a centre of the chain guide, said smallest distance is chosen such that the axis of the chain hinge meshing with the sprocket in this tooth gap segment is located on the pitch circle of the sprocket. A tooth gap segment is e.g. the area between two radial lines extending through the centre of the tooth apexes of neighbouring teeth. The above-mentioned selection of the smallest distance allows the force to be transmitted substantially via the chain hinge and this, in turn, is a prerequisite for a load distribution that is as uniform as possible and for a reduction of the dynamics in the chain drive. The largest distance between the chain guide and the centre of the chain guide is, however, preferably dimensioned such that essential force components are transmitted via the contact faces of the link plates and the circumferentially extending support contour of the chain guide. In this respect, it will be of advantage when the largest distance does not yet lead to a climbing of the chain or of the chain hinges in the teeth of the chain wheel. A climbing of the chain in the teeth prevents the contact between the chain hinge and the tooth gap, whereby the chain will be guided less effectively and more noise will be created.

According to an expedient embodiment, the tooth gaps can have flat side flanks. Side flanks having a flat inclination lead to a comparatively large distance between the individual side flanks and thus to a comparatively large tooth gap. The larger the tooth gap is, the greater the differences between the smallest and the largest distance of the perimeter profile of the chain guide to the centre thereof can be and this will also lead to enhanced possibilities of reducing the loads and the fluctuations of the chain forces in the timing drive. Due to the distance variation between the non-circular profile and the centre of the chain guide, a relative movement of the hinge centre axis to the centerline of the tooth gap is induced, whereby an otherwise occurring mis-meshing of the chain and a resultant tension on the chain wheel will be avoided or at least reduced.

In addition, the present invention relates to a timing chain drive with compensation of dynamic loads, comprising a hinge chain, in particular a roller chain, including inner chain links and outer chain links joined by chain hinges, said inner chain links and said outer chain links comprising inner link plates and outer link plates which are arranged parallel to one another, a driving chain wheel and at least one driven chain wheel; for compensating the dynamic load, at least one of said chain wheels, preferably the driving chain wheel, is implemented as a chain wheel including a chain guide with a non-circular perimeter profile in accordance with the above-mentioned embodiments according to the present invention. In such a timing chain drive, the dynamic load of the chain drive introduced by the internal combustion engine can be rendered more uniform, especially in the resonance region, and the associated vibration amplitude can be reduced substantially.

For a good cooperation of the hinge chain with the driving chain wheel and the driven chain wheels of the timing chain drive, the inner link plates and/or the outer link plates of the hinge chain can be provided with contact faces for bearing on the circumferentially extending support contour of the chain guide. An arrangement of the inner and/or outer link plates essentially parallel to the direction of movement of the hinge chain already allows the creation of a noise-reducing movement between the hinges of an associated chain link. In addition to simple link plate shapes, in the case of which the outer edges of the link plates extend parallel to one another in the direction of movement of the chain, the inner and outer link plates may e.g. also be implemented as waisted link plates or such that they have some other adapted shape. A waisted link plate which is adapted to the radius of a chain guide having a uniform support contour will be capable of rendering even more uniform the load profile of force transmission and of force distribution between the chain hinge and the contact faces of the chain link plates as well as the noise created when the chain engages the chain wheel. In addition, a waisted link plate shape allows a reduction of the maximum surface pressure between the link plate and the chain guide. Furthermore, other link plate shapes and contours of the chain wheel segments can be formed relative to one another in such a way that, in addition to the possibility of rendering the chain forces in the timing drive more uniform, a further reduction of noise and vibrations is possible.

A preferred embodiment of the timing chain drive is so conceived that the driving chain wheel is provided with at least one chain guide and arranged on a crankshaft of an internal combustion engine, the tangential point of contact between the driving chain and the driving chain wheel being located substantially centrally between a projecting section, which is in contact with the driving chain, and a subsequent non-projecting section, which is not yet in contact with the driving chain, at the time at which the highest moment occurs in the driving chain wheel. At the time at which the highest moment occurs in the driving chain wheel, the driving chain will also move with the highest speed on the load side. The tangential point of contact between the driving chain and the driving chain wheel is the point of contact of the tangent through the driving chain on the load side and the pitch circle of the driving chain wheel. It is thus possible to reduce the load of the timing drive directly at the location of force introduction as well as to reduce the vibration amplitudes especially in the resonance region by an additional excitation of the non-circular perimeter profile of the chain guide. The number of projecting and non-projecting sections depends on the vibration order to be suppressed. The ordinal number of the vibrations to be suppressed corresponds to the number of projecting sections and, consequently, also to the number of non-projecting sections. The exact position of the tangential point of contact at the time at which the highest moment occurs depends also on correction factors which take into account the individual nature of the timing chain drive, of the internal combustion engine as well as of the vibration excitation and of other side effects so that the central position of the point of contact between a projecting section and a subsequent non-projecting section may vary by ±10%, preferably ±5% of the angle between the projecting section and the non-projecting section.

If the internal combustion engine should be a four-cylinder engine, the chain guide can be configured as an elliptical profile and the projecting section, which is in contact with the driving chain, can be arranged such that it is displaced by approx. 45° relative to the point of contact. By means of the elliptical chain guide profile that is displaced by 45°, the vibration amplitude of a second-order vibration can be reduced significantly; also in this case, the exact position depends on respective correction factors for taking into account side effects, the variation width being up to ±90, preferably ±4.50. The additional excitation of the chain guide is thus applied on the chain drive by the elliptical chain guide profile at half the angular position between the excitation peaks generated by the pistons and the second-order vibration amplitude is reduced accordingly.

In the following, the present invention will be explained in more detail on the basis of one embodiment.

Figure 1:
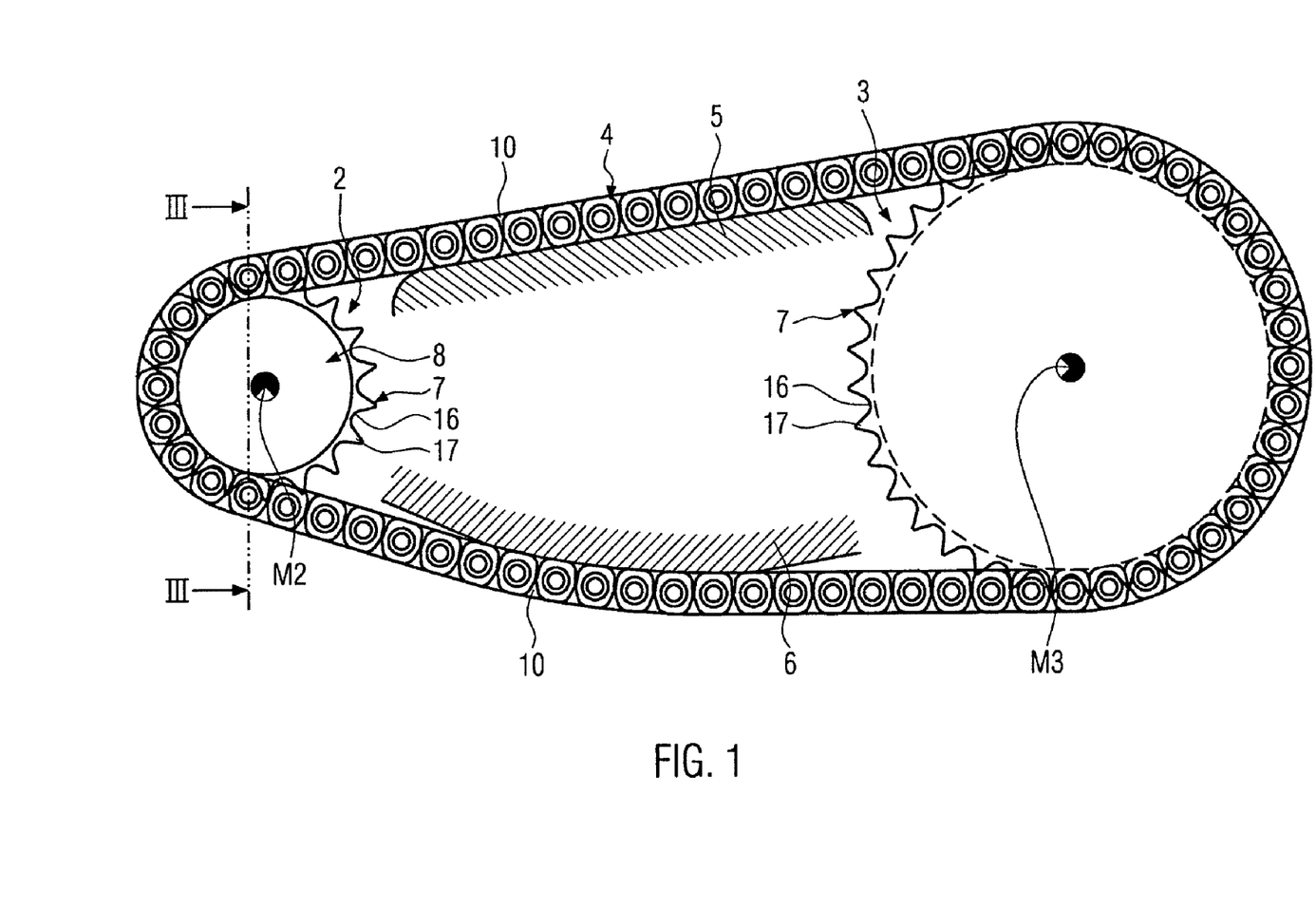
FIG. 1 shows a top view of a chain drive with two chain wheels.

FIG. 1 shows a simple chain drive 1 with two chain wheels 2, 3 and an endless driving chain 4 which is placed around the chain wheels 2, 3. On the load side of the driving chain a guide rail 5 is provided, which supports the driving chain 4 between the chain wheels 2, 3. On the no-load side of the driving chain 4, an additional tensioning rail 6 is provided, which applies to the driving chain 4 an outwardly directed pretension. For applying said pretension, the tensioning rail 6 is suitably supported (not shown) and connected to a tensioning device (not shown).

The smaller chain wheel 2 comprises a sprocket 7 with eighteen teeth 17 arranged in a circle around the axis of rotation, i.e. the centre M2 of the chain wheel 2, and a chain guide 8, the circumference of the support contour 9 having a non-circular profile. The larger chain wheel 3 comprises a sprocket 7 with thirty six teeth 17, said sprocket 7 being again arranged in a circle around the axis of rotation, i.e. the centre M3 of the chain wheel 3. The driving chain 4 is provided with seventy chain links 10 having a pitch of e.g. ⅜".

The schematic chain drive 1 shown in FIG. 1 can act as a minimum timing chain drive of a four-cylinder in-line reciprocating piston internal combustion engine. The smaller chain wheel 2 is connected to the crankshaft (not shown) of the internal combustion engine and the larger chain wheel 3 is connected to the camshaft (not shown) of the internal combustion engine.

Figure 2:
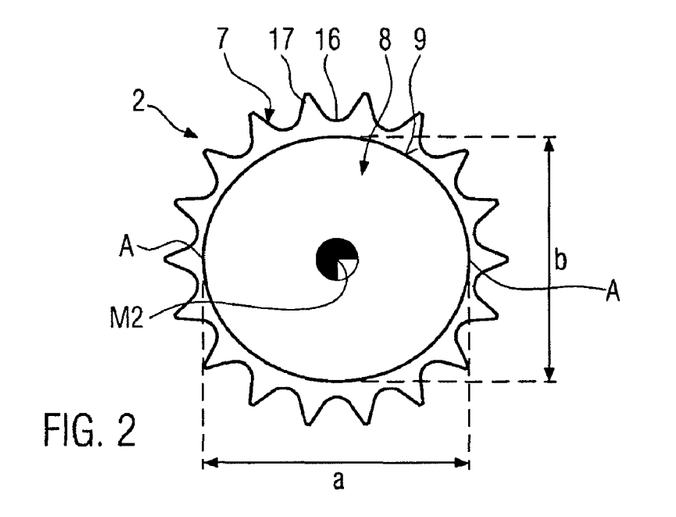
FIG. 2 shows a top view of a chain wheel with a chain guide according to FIG. 1.

FIG. 2 shows an enlarged view of the smaller chain wheel 2 with the chain guide 8 without the driving chain 4. The chain guide 8, which laterally projects relative to the sprocket 7 of the chain wheel 2, is provided with a circumferentially extending support contour 9 which defines the perimeter of the chain guide 8, the contact faces 15 of the link plates 13, 14 bearing on said support contour 9. In the embodiment shown in FIG. 2, the chain guide is implemented as an ellipse with two projecting sections A, the diameter a horizontally to the representation of the chain wheel 2 being larger than the diameter b perpendicular to the representation of the chain wheel 2. The elliptical chain guide 8 shown in FIG. 2 has a support contour 9 with a uniformly curved surface so that the support contour 9 itself defines the perimeter of the chain guide 8. In addition to such a uniformly curved surface of the support contour, the surface of the support contour 9 can, in accordance with the chain guide variants shown in EP 1 184 593 B1, also be provided with a linear, concave or convex surface configuration so as to cooperate with the respective shapes of the link plates 13, 14 of the individual chain links 10. This linear, concave or convex surface configuration recurs regularly from one tooth to the next so that at least one raised portion or point will always be formed from one tooth to the next. When the circumferentially extending support contour is configured in this way, the perimeter of the chain guide is defined by the connection of the raised portions with a continuously curved curve shape. Hence, the perimeter is defined as the opening having the smallest circumference/volume ratio which is just large enough for fitting in the chain guide 8, essentially each raised portion of the support contour associated with a section of the chain guide 8 being in contact with the perimeter.

Figure 3:
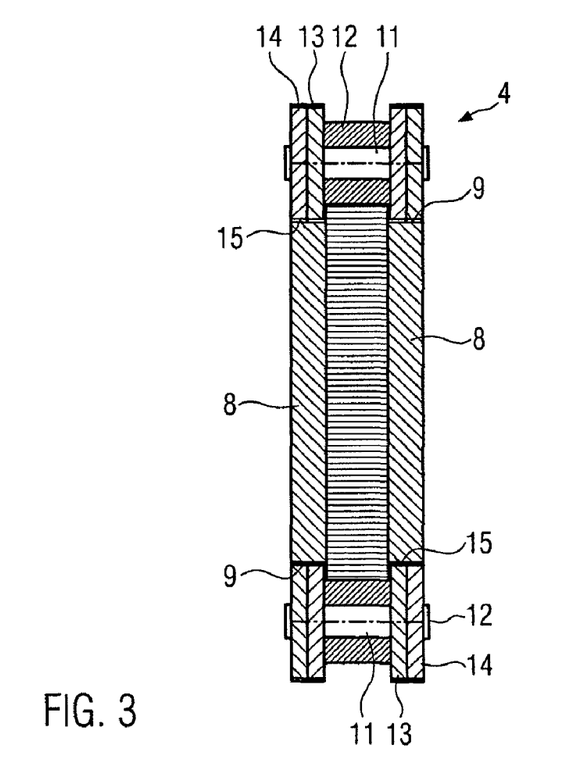
FIG. 3 shows a section through the chain wheel with a chain guide according to FIG. 2 along section III-III of FIG. 1.

FIG. 3 shows a section through the chain wheel 2 along line III-III in FIG. 1 in the engaged condition of the driving chain 4. This sectional drawing shows clearly that the chain wheel 2 consists of a central portion on the circumference of which the sprocket 7 with the outwardly projecting teeth 17 is arranged, the hinge sleeves 11 and the rollers of a roller chain arranged on said hinge sleeves 11 meshing with said teeth 17. The hinge pins 12, which interconnect neighbouring chain links 10, extend through the hinge sleeves 11. The inner link plates 13 and the outer link plates 14 have contact faces 15 at least on the side facing the chain wheel 2, said contact faces 15 bearing on the support contour 9 of the chain guide 8 provided on both sides of the chain wheel 2. In addition to the chain guide 8 shown in FIG. 3, the chain guide may also be implemented as an elliptical ring projecting laterally beyond the central portion of the chain wheel 2.

Figure 4:
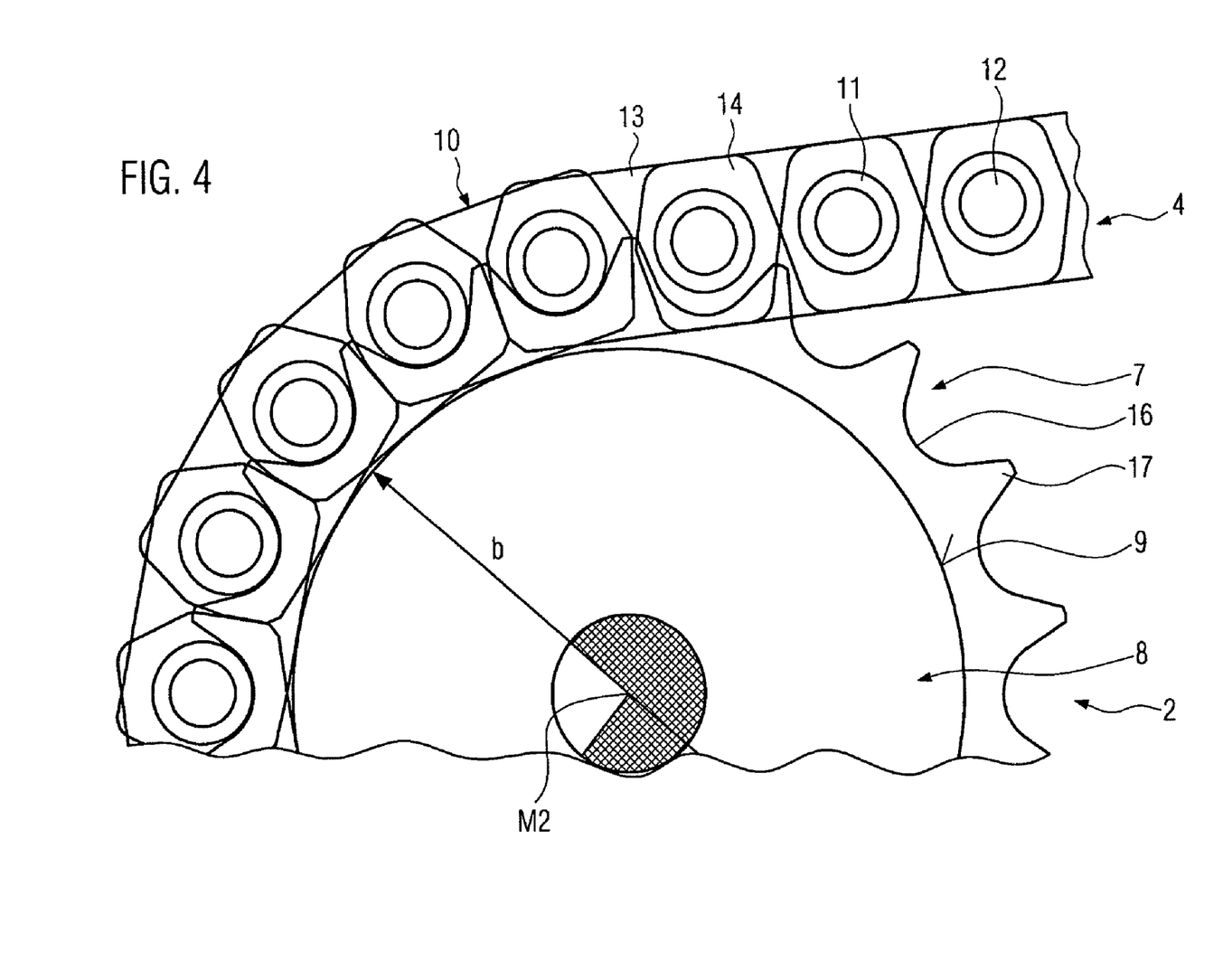
FIG. 4 shows a detail of the chain wheel with a chain guide according to FIG. 1 in a condition in which the driving chain bears on the chain guide to a minimum extent.
Figure 5:
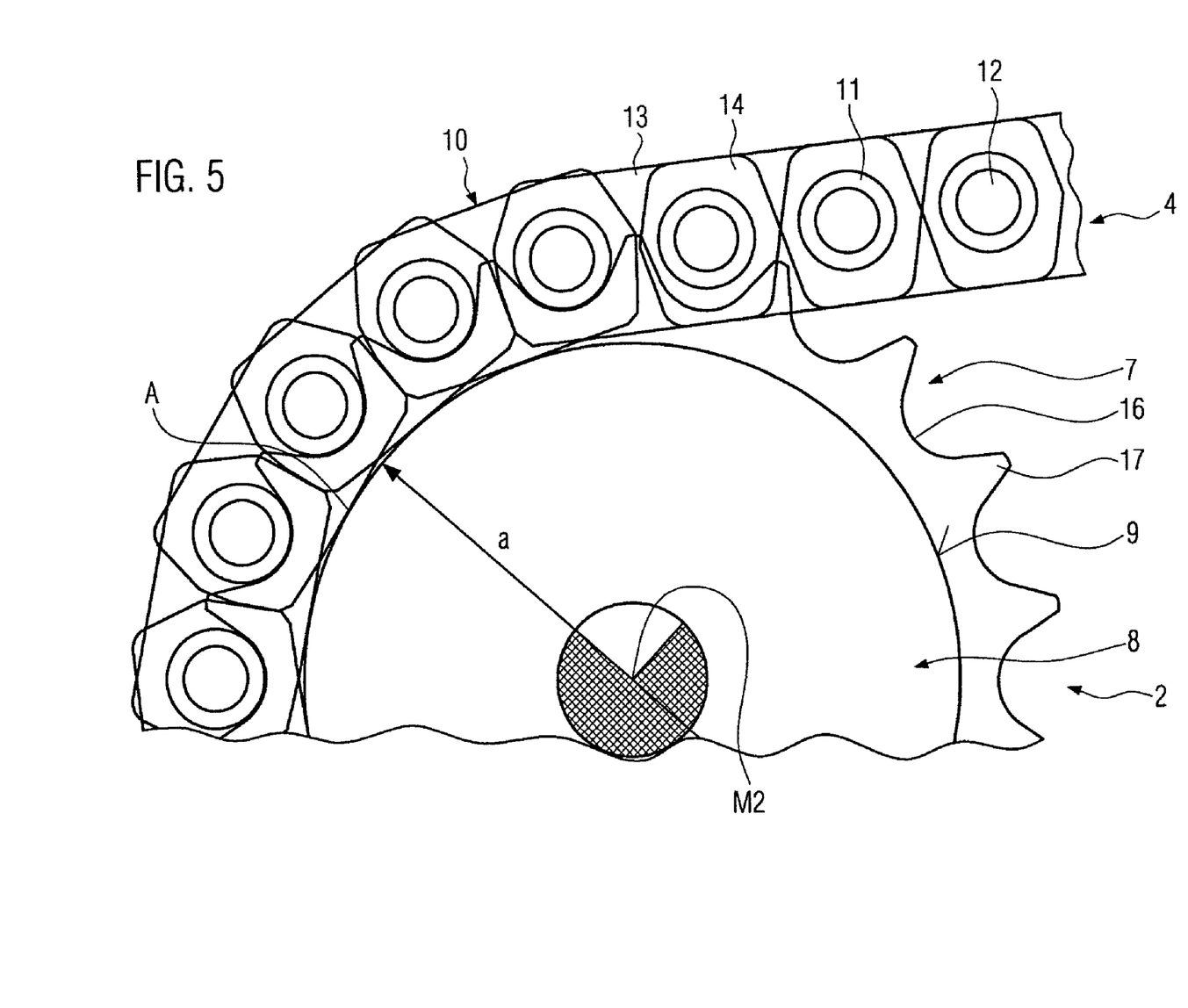
FIG. 5 shows a detail of the chain wheel with a chain guide according to FIG. 1 in a condition in which the driving chain bears on the chain guide to a maximum extent.

FIGS. 4 and 5 show once more an enlarged detail of the chain wheel 2 in the engaged condition of the driving chain 4. In the chain drive 1, chain force reduction takes place between the chain wheel 2 and the driving chain 4 via the sprocket 7 and the chain guide 8 of the chain wheel 2, and the distribution of the chain force is essentially determined by the instantaneous position of the support contour 9 of the chain guide 8. At the normal position of the chain 4, chain force reduction in the teeth takes place through the first four to five meshing teeth 17. FIG. 4 shows the position of the chain wheel 2 at which the smallest diameter b of the chain guide 8 with an elliptical perimeter profile is in full engagement with the driving chain 4, i.e. with the inner and outer link plates 13, 14 of the respective chain links 10. The hinge sleeves 11 of the chain links 10, which are in engagement with the chain wheel 2, are in optimum fitting contact with the tooth gaps 16 of the sprocket 7, i.e. the hinge axes of the chain hinges are located on the pitch circle of the sprocket 7. In this arrangement, force reduction from the chain wheel 2 to the driving chain 4 takes place essentially through the contact of the chain hinges with the sprocket 7 and only to a minimum extent through the contact between the link plates 13, 14 and the chain guide 8.

FIG. 5, however, shows the extreme position of the driving chain 4 on the chain wheel 2; at this position, the largest diameter a of the elliptical chain guide 8 acts especially on the first (4 to 5) teeth 17 of the chain wheel 2 which are in mesh with the driving chain 4. The elevation of the support contour 9, i.e. the projecting sections A of the chain guide 8 are chosen such that the driving chain 4 will be prevented from climbing the teeth of the chain wheel 2. The climbing of the chain or of the chain hinge between the teeth 17 depends not only on the aspect ratio of the largest and smallest distances (a/2, b/2) to the centre M2 of the chain guide 8 and of the chain wheel 2, respectively, but also on the shape of the tooth gaps 16. In the case of the present elliptical profile of the chain guide 8, the aspect ration between the largest diameter a and the smallest diameter b is smaller than 1.025, and preferably between 1.01 and 1.015. In the case of the smallest diameter b, the distance (b/2) to the centre M2 is to be regarded as the distance at which a minimum force contact between the link plates 13, 14 and the support contour 9 still takes place, said support contour being here referred to as non-projecting sections B. If an excessively large elevation (a/2) of the support contours 9 is chosen, the chain, i.e. the chain hinge will climb the teeth and this will have correspondingly negative effects on the wear and on the running characteristics of the chain.

If, as shown in FIG. 5, the elevation A of the support contour 9 becomes effective, a maximum contact force between the contact faces 15 of the link plates 13, 14 and the support contour 9 of the chain guide 8 will occur. The first chain hinges positioned in the tooth gaps 16 of the chain wheel 2 only contribute to a minor extent to a reduction of forces between the driving chain 4 and the chain wheel 2. In the case of the further tooth gaps 16, the contact point between the hinge sleeves 11 of the chain hinges and the tooth gaps 16 is displaced in the direction of the tooth flanks. The maximum contact forces acting on the link plates 13, 14 can reach a magnitude which approaches the contact force between the sprocket and the chain hinges. The non-uniform distribution of the contact force between the chain hinges of the driving chain 4 and the sprocket of the chain wheel 2 as well as between the link plates 13, 14 and the chain guide 8 of the chain wheel 2 can essentially reduce the dynamic load of the chain drive 1, in particular in the vicinity of resonance points, when the above-mentioned sections A of the support contour 9, i.e. of the non-circular profile of the perimeter of the chain guide 8 are arranged in a suitable manner, and the NVH behaviour of a motor vehicle can be improved substantially.

The non-circular perimeter profile of the chain guide can, especially in the case of comparatively highly projecting sections A of the support contour 9, lead to mis-meshing of the driving chain 4 and a resultant tension on the chain wheel 2. If such mis-meshing occurs, the negative effects on the chain 4 can be alleviated by adapting the tooth flank contours in the respective section of the sprocket 7, in particular by means of an asymmetric tooth shape.

Figure 6:
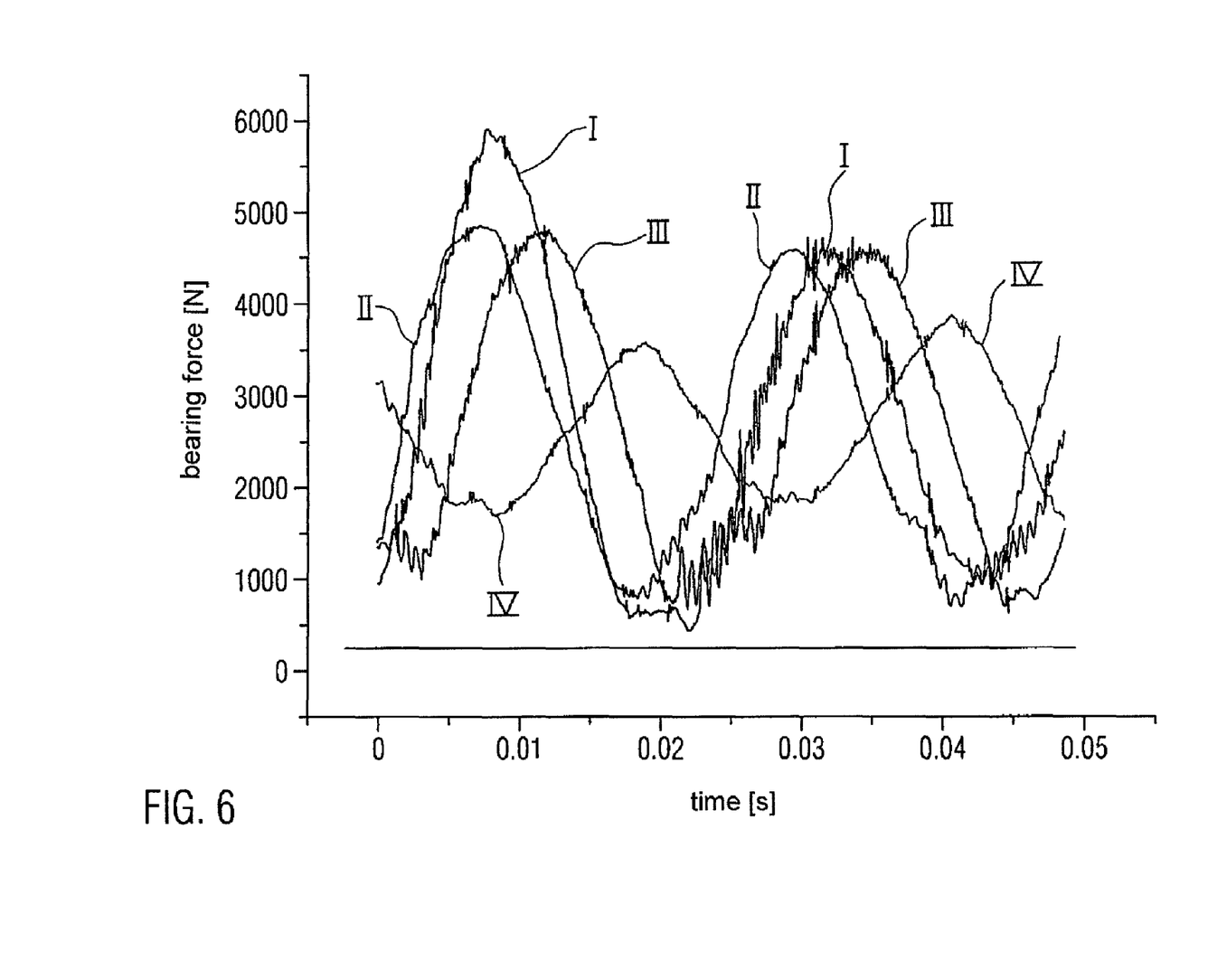
FIG. 6 shows a diagram of the dynamic load of the chain drive according to FIG. 1, represented as bearing force of the chain wheel plotted against time.

FIG. 6 shows the dynamic load on a chain drive 1 in the form of fluctuations of the bearing force of the drive wheel, i.e. of the chain wheel 2 when used as a timing chain drive. The representation shown in FIG. 6 is based on a simulation on the basis of the chain drive 1 shown in FIG. 1 with a speed of 1,233 rotations per minute (approx. 10% below the resonance speed). In this diagram, curve I shows the bearing force characteristics without any chain guide 8 on the chain wheel 2, but also the longitudinal forces occurring at different positions of the projecting sections A of the chain guide 8. Curve II stands for a position of the projecting section A of the chain guide at the same angular position of maximum excitation, corresponding to an angular position of 0°, whereas in the case of curve III said section A is displaced by 45° relative thereto and in the case of curve IV it is displaced by 90° relative thereto. In comparison with the characteristics of the dynamic bearing force without any chain guide 8 (curve I), an improvement of the dynamic load of the chain drive 1 is already achieved at an angular position of 0° and 45° relative to the maximum excitation (curves II and III) by the chain guide 8 having a non-circular perimeter profile. At an advantageous position of the projecting sections A of the support contour 9, i.e. between the maxima of the excitations of the chain wheel 2 (by a crankshaft) corresponding to an angular position of 90°, the amplitude of the dynamic bearing load of the chain wheel 2 decreases to 30% relative to the load occurring without compensation by a chain guide 8.

When the dynamic load on the chain drive 1 is superimposed on the output torque at the chain wheel 3, a chain wheel 2 with a chain guide 8 according to the present invention will even achieve a reduction of the bearing force amplitude to 10%.

The invention claimed is:

1. A chain wheel comprising an axis of rotation, a substantially circular sprocket arranged around the axis of rotation and having a plurality of circumferentially distributed alternating teeth and tooth gaps, and at least one chain guide which rotates with the sprocket, said chain guide being provided with a surface which circumferentially extends on the circumference of the chain guide and defines a support contour for bearing on contact faces of link plates, and said support contour extending along a curved circumference which constitutes the perimeter of the chain guide, wherein the perimeter of the chain guide has a non-circular profile which is unchanging relative to the teeth and the tooth gaps of the sprocket.

2. The chain wheel according to claim 1, wherein the distance between the perimeter and a centre of the chain guide varies, at least partially, from one tooth to the next so as to define the non-circular profile.

3. The chain wheel according to claim 1, wherein the perimeter of the chain guide includes at least two projecting sections.

4. The chain wheel according to claim 3, wherein the perimeter of the chain guide has an elliptical profile.

5. The chain wheel according to claim 4, wherein the elliptical profile of the chain guide has an aspect ratio of the largest and smallest distances to the centre of the chain guide which is smaller than 1.025.

6. The chain wheel according to claim 4, wherein the elliptical profile of the chain guide has an aspect ratio of the largest and smallest distances to the centre of the chain guide which is between 1.01 and 1.015.

7. The chain wheel according to claim 1, wherein the center of the chain guide is located in the axis of rotation of the chain wheel.

8. The chain wheel according to claim 1, wherein two chain guides are provided, said chain guides being arranged symmetrically, such that one chain guide is arranged on each side of the chain wheel.

9. The chain wheel according to claim 1, wherein the sprocket is circular and the teeth of the sprocket are arranged uniformly around the axis of rotation of the chain wheel.

10. The chain wheel according to claim 1, wherein the smallest distance of the non-circular profile of the chain guide to a center of the chain guide is chosen such that the axis of the chain hinge meshing in a tooth space of the sprocket being in radial line with the smallest distance of the non-circular profile of the chain guide is located on the pitch circle of the sprocket.

11. A timing chain drive with compensation of dynamic loads, comprising a hinge chain, including inner chain links and outer chain links joined by chain hinges, said inner chain links and said outer chain links comprising inner link plates and outer link plates which are arranged parallel to one another, a driving chain wheel and at least one driven chain wheel, wherein for compensating the dynamic load, at least one of said chain wheels, is a chain wheel according to claim 1.

12. The timing chain drive according to claim 11, wherein at least one of the inner link plates and the outer link plates are provided with contact faces for bearing on the circumferentially extending support contour of the chain guide.

13. The timing chain drive according to claim 12, wherein the contact faces of at least one of the inner link plates and of the outer link plates are arranged essentially parallel to the direction of movement of the hinge chain.

14. The timing chain drive according to claim 11, wherein the driving chain wheel is provided with the at least one chain guide and arranged on a crankshaft of an internal combustion engine, the tangential point of contact between the driving chain and the driving chain wheel being located substantially centrally between a projecting section, which is in contact with the driving chain, and a subsequent non-projecting section, which is not yet in contact with the driving chain, at the time at which the highest moment occurs in the driving chain wheel.

15. The timing chain drive according to claim 14, wherein the internal combustion engine is a four-cylinder engine, wherein the chain guide is configured as an elliptical profile and the projecting section, which is in contact with the driving chain, is arranged such that the projecting section is displaced by approximately 45° relative to the tangential point of contact.

16. The timing chain drive according to claim 11, wherein the driving chain wheel is a chain wheel according to claim 1.

17. The chain wheel according to claim 1, wherein the sprocket and the chain guide are rigidly mounted.

18. The chain wheel according to claim 1, wherein the chain guide is rigid.

* * * * *